(12) United States Patent
Yao (10) Patent No.: US 8,331,567 B2
(45) Date of Patent: Dec. 11, 2012

(54) METHODS AND APPARATUSES FOR GENERATING DYNAMIC PAIRWISE MASTER KEYS USING AN IMAGE

(75) Inventor: Zongming Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 903 days.

(21) Appl. No.: 12/414,520

(22) Filed: Mar. 30, 2009

(65) Prior Publication Data

US 2010/0246818 A1  Sep. 30, 2010

(51) Int. Cl.
  *H04L 9/08* (2006.01)
(52) U.S. Cl. ............................ 380/277; 380/44
(58) Field of Classification Search .............. 380/277
  See application file for complete search history.

(56) References Cited

U.S. PATENT DOCUMENTS

| | | | | |
|---|---|---|---|---|
| 5,774,549 | A * | 6/1998 | Nielsen | 380/200 |
| 7,457,413 | B2 * | 11/2008 | Thuvesholmen et al. | 380/46 |
| 8,165,303 | B1 * | 4/2012 | Steele et al. | 380/277 |
| 2001/0004231 | A1 * | 6/2001 | Bailey | 340/5.53 |
| 2003/0140232 | A1 * | 7/2003 | De Lanauze | 713/186 |
| 2005/0198221 | A1 * | 9/2005 | Manchester et al. | 709/220 |
| 2006/0221915 | A1 * | 10/2006 | Gatta et al. | 370/338 |
| 2008/0045180 | A1 * | 2/2008 | Yang et al. | 455/411 |
| 2008/0175377 | A1 * | 7/2008 | Merrill | 380/30 |
| 2010/0046808 | A1 * | 2/2010 | Connell et al. | 382/117 |

OTHER PUBLICATIONS

"Wireless LAN Specification", IEEE Std 802.11-2007 (IEEE Jun. 12, 2007).*
IEEE 802.11i-2004: Amendment 6: Medium Access Control (MAC) Security Enhancements:, IEEE Standards, Jul. 23, 2004, 190 pages.
RSA Laboratories, "PKCS #5 v2.0: Password-Based Cryptography Standard", Mar. 25, 1999, 30 pages.
Otto, T., "Extensible Network Access Authorization", Jul. 4, 2006, 180 pages.

* cited by examiner

*Primary Examiner* — Kaveh Abrishamkar
*Assistant Examiner* — Theodore Parsons
(74) *Attorney, Agent, or Firm* — Sutherland Asbill & Brennan LLP (57) ABSTRACT

A method to generate a pairwise master key for use in establishing a wireless connection is presented. In one embodiment, the method comprises determining a region in an image. The method further comprises generating the pairwise master key based at least on contents of the region in the image.

23 Claims, 8 Drawing Sheets

| Element ID 600 | Element Length 601 | Security Level 602 |
|---|---|---|

Figure 6

METHODS AND APPARATUSES FOR
GENERATING DYNAMIC PAIRWISE
MASTER KEYS USING AN IMAGE

FIELD OF THE INVENTION

Embodiments of the invention relate to the field of data network, and more particularly to key generation for data network communications.

BACKGROUND OF THE INVENTION

Wi-Fi Protected Access (WPA) and Wi-Fi Protected Access 2 (WPA2) are wireless security protocols proposed in the IEEE 802.11i specification. For enterprise network environments, WPA/WPA2 requires authentication in two phases. The first is an open system authentication and the second uses IEEE 802.1X with an Extensible Authentication Protocol (EAP) authentication method. For environments without a Remote Authentication Dial-In User Service (RADIUS) infrastructure (e.g., small office/home office networks), WPA/WPA2 Personal supports the use of a preshared key (PSK).

WPA/WPA2 requires the determination of a pairwise master key (PMK) based on the EAP or the PSK. WPA/WPA2 also requires the calculation of pairwise transient keys (PTKs) through a 4-way handshake.

In particular, WPA-PSK (Wi-Fi Protected Access with Pre-Shared Key) and WPA2-PSK (Wi-Fi Protected Access 2 with Pre-Shared Key) are commonly implemented and used in today's wireless networks for security purposes. WPA-PSK/WPA2-PSK uses a key generation function to calculate a pairwise master key (PMK) based on a static passphrase. The PMK remains unchanged in subsequent associations unless the static passphrase is changed on a client system and an access point. Thus, in general, clients and access points use a same PMK in the WPA-PSK/WPA2-PSK mechanisms unless the static passphrase is changed.

In other words, if a PMK of a client is compromised, network security of all other clients connecting to access points in a same network is also compromised. Additionally, with advances in high speed computing, it is now possible to determine a correct passphrase from millions of combinations, in a reasonably short time frame, by performing brute force attacks.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Embodiments of methods and apparatuses for generating a pairwise master key (PMK) are described. In one embodiment, the PMK is generated, by using a hash function, based at least on contents of a region in an image. While the embodiments are discussed in reference to WPA-PSK/WPA-PSK2, the techniques are also applicable in conjunction with other protocols, such as, for example, EAP, IEEE 802.11X, IEEE 802.16, IEEE 802.21, etc.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for generating dynamic pairwise master keys (PMKs). Specifically, generating a pairwise master key for use in establishing a wireless connection is primarily discussed in reference to computer systems. However, the methods and apparatus for generating the PMK is not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Wireless Communication System

Figure 1:
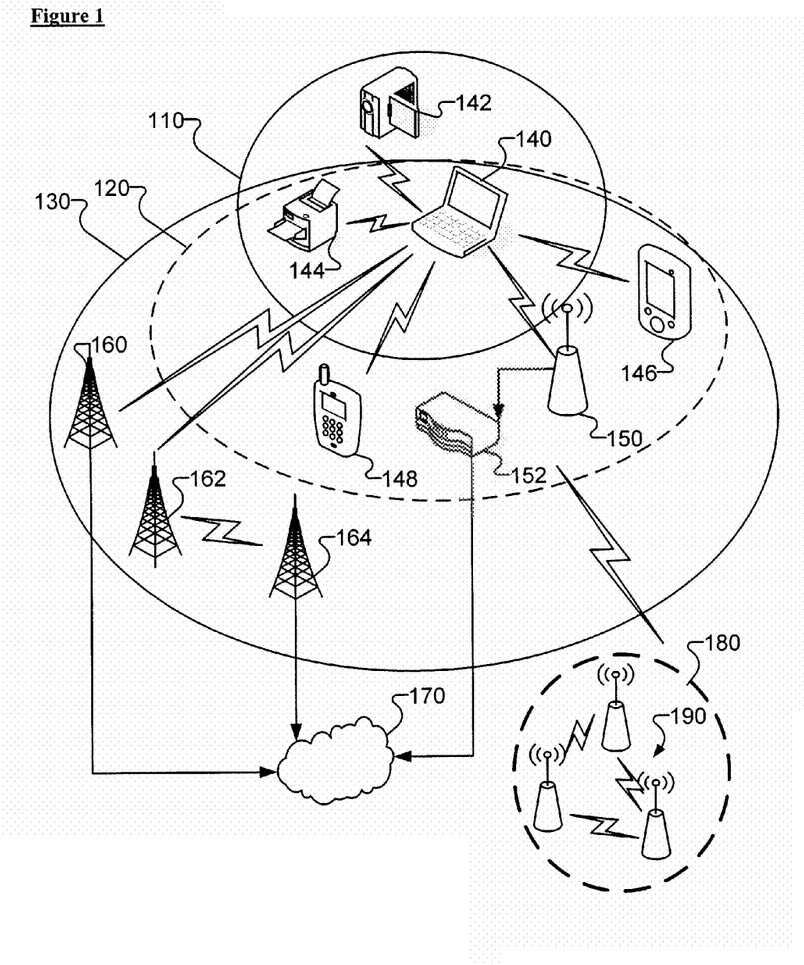
FIG. 1 is a diagram representation of a wireless communication system in accordance with one embodiment of the invention.

FIG. 1 is a diagram representation of a wireless communication system in accordance with one embodiment of the invention. Referring to FIG. 1, in one embodiment, wireless communication system 100 includes one or more wireless communication networks, generally shown as 110, 120, and 130.

In one embodiment, the wireless communication system 100 includes a wireless personal area network (WPAN) 110, a wireless local area network (WLAN) 120, and a wireless metropolitan area network (WMAN) 130. In other embodiments, wireless communication system 100 includes additional or fewer wireless communication networks. For example, wireless communication network 100 includes additional WPANs, WLANs, and/or WMANs. The methods and apparatus described herein are not limited in this regard.

In one embodiment, wireless communication system 100 includes one or more subscriber stations (e.g., shown as 140, 142, 144, 146, and 148). For example, the subscriber stations 140, 142, 144, 146, and 148 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 100 includes more or fewer subscriber stations.

In one embodiment, subscriber stations 140, 142, 144, 146, and 148 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MDM), other suitable modulation techniques, or combinations thereof to communicate via wireless links.

In one embodiment, laptop computer 140 operates in accordance with suitable wireless communication protocols that require very low power, such as, for example, Bluetooth™, ultra-wide band (UWB), radio frequency identification (RFID), or combinations thereof to implement the WPAN 110. In one embodiment, laptop computer 140 communicates with devices associated with the WPAN 110, such as, for example, video camera 142, printer 144, or both via wireless links.

In one embodiment, laptop computer 140 uses direct sequence spread spectrum (DSSS) modulation, frequency hopping spread spectrum (FHSS) modulation, or both to implement the WLAN 120 (e.g., a basic service set (BSS) network in accordance with the 802.11 family of standards developed by the Institute of Electrical and Electronic Engineers (IEEE) or variations and evolutions of these standards). For example, laptop computer 140 communicates with devices associated with the WLAN 120 such as printer 144, handheld computer 146, smart phone 148, or combinations thereof via wireless links.

In one embodiment, laptop computer 140 also communicates with access point (AP) 150 via a wireless link. AP 150 is operatively coupled to router 152 as described in further detail below. Alternatively, AP 150 and router 152 may be integrated into a single device (e.g., a wireless router).

In one embodiment, laptop computer 140 uses OFDM modulation to transmit large amounts of digital data by splitting a radio frequency signal into multiple small sub-signals, which in turn, are transmitted simultaneously at different frequencies. In one embodiment, laptop computer 140 uses OFDM modulation to implement WMAN 130. For example, laptop computer 140 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 160, 162, and 164, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 120 and WMAN 130 are operatively coupled to network 170 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 120 is operatively coupled to network 170 via AP 150 and router 152. In another embodiment, WMAN 130 is operatively coupled to network 170 via base station(s) 160, 162, 164, or combinations thereof. Network 170 includes one or more network servers (not shown).

In one embodiment, wireless communication system 100 includes other suitable wireless communication networks, such as, for example, wireless mesh networks, shown as 180. In one embodiment, AP 150, base stations 160, 162, and 164 are associated with one or more wireless mesh networks. In one embodiment, AP 150 communicates with or operates as one of mesh points (MPs) 190 of wireless mesh network 180. In one embodiment, AP 150 receives and transmits data in connection with one or more of MPs 190. In one embodiment, MPs 190 include access points, redistribution points, end points, other suitable connection points, or combinations thereof for traffic flows via mesh paths. MPs 190 use any modulation techniques, wireless communication protocols, wired interfaces, or combinations thereof described above to communicate.

In one embodiment, wireless communication system 100 includes a wireless wide area network (WWAN) such as a cellular radio network (not shown). Laptop computer 140 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WPAN, a WLAN, and a WMAN, In one embodiment, wireless communication system 100 includes other combinations of WPANs, WLANs, WMANs, and WWANs. The methods and apparatus described herein are not limited in this regard.

In one embodiment, wireless communication system 100 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 140, 142, 144, 146, and 148) AP 150, or base stations (e.g., 160, 162, and 164) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Wireless Communication Device

Figure 2A:
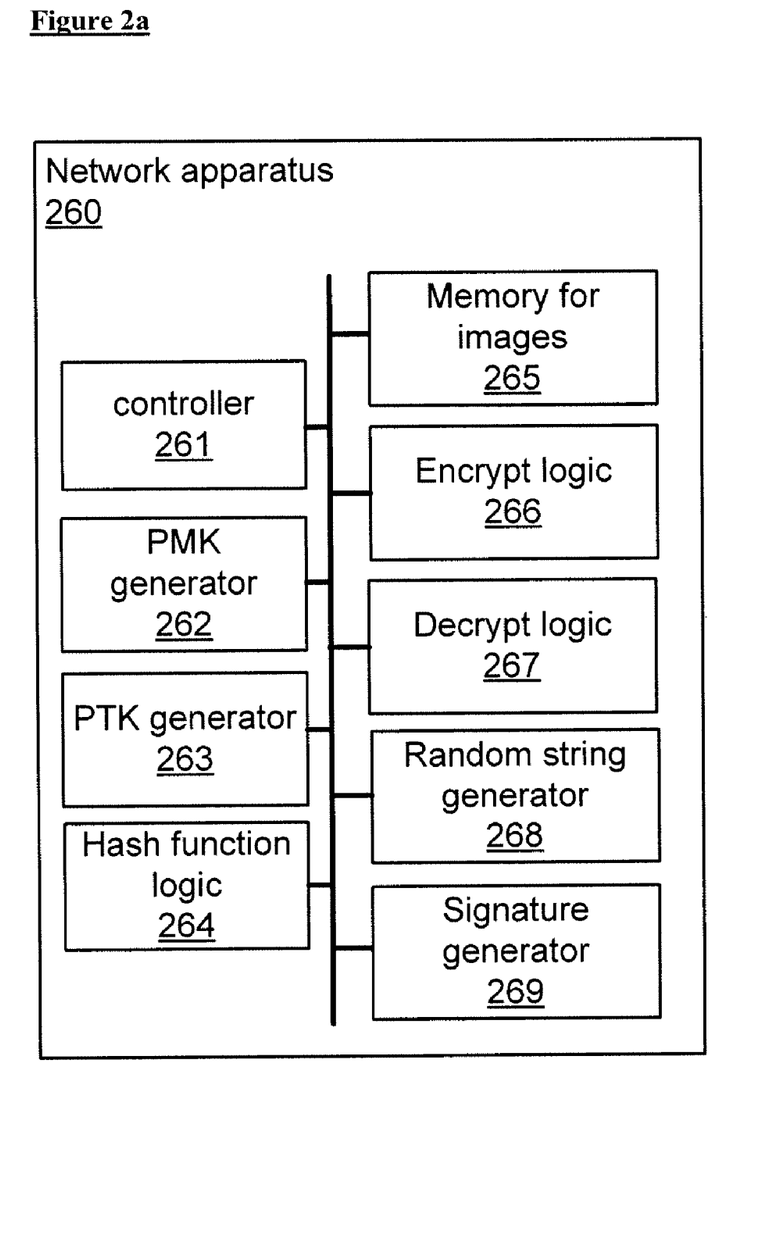
FIG. 2a shows a network apparatus in accordance with one embodiment of the invention.

FIG. 2a shows a network apparatus in accordance with one embodiment of the invention. In one embodiment, the network apparatus is an embodiment of a wireless electronic device, a client, an access point, or a base station with respect to FIG. 1. In some embodiments, a client is also referred to as a supplicant, a client station, or a subscriber station.

Referring to FIG. 2a, in one embodiment, network apparatus 260 comprises controller 261, pairwise master key generator (PMK generator) 262, pairwise transient key generator (PTK generator) 263, hash function logic 264, memory 265, encrypt logic 266, decrypt logic 267, random string generator 268, and signature generator 269. In one embodiment, the aforementioned units are shown as discrete devices. Other embodiments are possible where some or all of these units are integrated within a device or within other devices. In other embodiments, the aforementioned units are distributed throughout a system in hardware, software, or some combination thereof.

In one embodiment, controller 261 manages and coordinates operations of PMK generator 262, PTK generator 263, hash function logic 264, encrypt logic 266, decrypt logic 267, random string generator 266, signature generator 269, and other components (not shown), such as, for example, a transceiver, an antenna, a power control unit, etc.

In one embodiment, PMK, PTK, ANonce (a "number used once" generated by an authenticator), SNonce (a "number used once" generated by a supplicant) are used in conjunction with wireless protocols known in the art, for example, IEEE 802.11i standard ("IEEE 802.11i-2004: Amendment 6: Medium Access Control (MAC) Security Enhancements", IEEE Standards. 2004-07-23).

In one embodiment, memory 265 stores one or more images to be used in operation for generating dynamic pairwise master keys (PMKs). In one embodiment, the images are pre-shared with another system before establishing a wireless connection. In one embodiment, system administrators store one or more images for generating dynamic PMKs.

In one embodiment, random string generator 268 generates a random bit string (e.g., an ANonce and an SNonce). In one embodiment, the random bit string is 256 bits. In one embodiment, random string generator 268 is a cryptographically secure pseudo-random number generator.

In one embodiment, hash function logic 264 performs a hash operation on a message. In one embodiment, hash function logic 264 supports SHA (Secure Hash Algorithm) functions, such as, for example, SHA-0, SHA-1, and SHA-2. In one embodiment, hash function logic 264 performs a SHA-2 variant on a 256-bit message digest (e.g., SHA-256). In other embodiments, hash function logic 264 is able to perform a SHA function on various sized of message digests (e.g., SHA-224, SHA-256, SHA-384, and SHA-512).

In one embodiment, hash function logic 264 is operable to perform an AP hash function (APHash). In one embodiment, APHash generates a numeral output bounded within a range (e.g., 0 to upper bound). In one embodiment, outputs from APHash are distributed substantially uniform within the range specified.

In one embodiment, an output from hash function logic 264 is used to select a random region in an image (e.g., an image from memory 265). Therefore, a good randomness is required for security reasons. It will be appreciated by those skilled in the art that other functions may be used to generate, based on an input, a random value bounded within a range.

In one embodiment, AP Hash is defined as below in Table 1.

TABLE 1

APHash function

```
static;
uint32_t APHash (unit8_t * data, uint32_t len, uint32_t initval)
{
    uint32_t hash =0;
    uint32_t i = 0;
    if (data ==NULL) return 0;
    for (i=0; i < len ; data++; i++)
    {
        hash^=((i & 1) == 0) ? ((hash << 7) ^ (*data) ^ (hash >> 3)) :
                              (~((hash << 11) ^ (*data) ^ (hash >> 5)) );
    }
    return hash % initval;
}
```

Notes:
data: an unsigned pointer to an input to be hashed;
len: a total size of the input (in terms of bytes);
initval: upper bound of a range;
Note:
return values of APHash function are distributed among 0 to initval.

In one embodiment, encrypt logic 266 encrypts a message (information) by performing an encryption algorithm. In one embodiment, decrypt logic 267 decrypts an encrypted version of a message to retrieve an original message. In one embodiment, encrypt logic 266 performs AES encryption on information (e.g., message, string, an ANonce, an SNonce, etc.). In one embodiment, decrypt logic 267 performs AES decryption on encrypted information.

In one embodiment, encrypt logic 266 and decrypt logic 267 support symmetric key algorithms (e.g., DES, RC4, RC5, AES, etc.). A client and an authenticator share the knowledge of a symmetric key.

In one embodiment, signature generator 269 retrieves contents of a region selected from an image stored in memory 265. In one embodiment, contents of an image region are data representing each pixel of in the region. In one embodiment, the size of the region is associated with a level of security (e.g., from 1 to 5). In other embodiments, other ranges of security levels are used.

In one embodiment, signature generator 269 uses information such as, for example, an ANonce, an SNonce, to generate a signature (bit string) which will be used by PMK generator 262. In one embodiment, if the ANonce or the SNonce is encrypted, decrypt logic 267 performs decryption to retrieve the original ANonce or SNonce, respectively.

In one embodiment, signature generator 269 uses hash function logic 264 to generate an x-coordinate based on an ANonce and to generate a y-coordinate based on an SNonce. In one embodiment, signature generator 269 performs operations based on functions describes as follows:

$$x=APHash(ANonce, sizeof(ANonce), length-10*level\_of\_security)$$

$$y=APHash(SNonce, sizeof(SNonce), width-10*level\_of\_security)$$

Note: length and width indicate the dimension of an image; level_of_security is an integer ranging from 1 to 5.

In one embodiment, signature generator 269 retrieves contents of a rectangular region in an image. Coordinates of the top left corner of the region is (x, y), whereas coordinates of the bottom right corner of the region is (x+10*level_of_security, y+10*level_of_security). In one embodiment, values of length and width of the image are larger than the value of 10* level_of_security (e.g., 20-1000 times larger). In one embodiment, a signature is a bit string representing contents of the image region with respect to an image file format. A process of signature generation will be described in further detail below with additional references to the remaining figures.

In one embodiment, PMK generator 262 generates dynamic PMKs. In one embodiment, each PMK is a 256-bit string (i.e., 32 bytes data). In one embodiment, PMK generator 262 generates a PMK based on the signature (information) from signature generator 269, ANonce, and SNonce. In one embodiment, PMK generator 262 generates a PMK by performing a SHA-256 function on a string comprising ANonce, SNonce, and the signature. In one embodiment, PMK generator 262 performs an operation based on a function described as follows:

$$PMK=SHA256(ANonce\|SNonce\|Signature), \text{ where}$$
"∥" denotes a string concatenation operation In one embodiment, PTK generator 263 generates a PTK based on the PMK generated by PMK generator 262. In one embodiment, a PTK is a session key that is derived from the PMK. In one embodiment, a PTK is generated using a pseudo-random expansion function (PRF-X) as described in IEEE 802.11i-2004. In one embodiment, a PTK is generated further based on inputs such as AP address, STA address (client station address), ANonce, SNonce, and a protocol identifier.

In one embodiment, network apparatus 260 operates in compatible with TKIP (Temporal Key Integrity Protocol) or CCMP (Counter Mode with Cipher Block Chaining Message Authentication Code Protocol) with respect to IEEE 802.11i. In one embodiment, CCMP is a mandatory part of the WPA2 protocol and an optional part of the WPA protocol. In one embodiment, a PTK contains information as described in IEEE 802.11i, such as, for example, Key Confirmation Key (KCK), Key Encryption Key (KEK), and Temporal Key (TK).

Figure 2B:
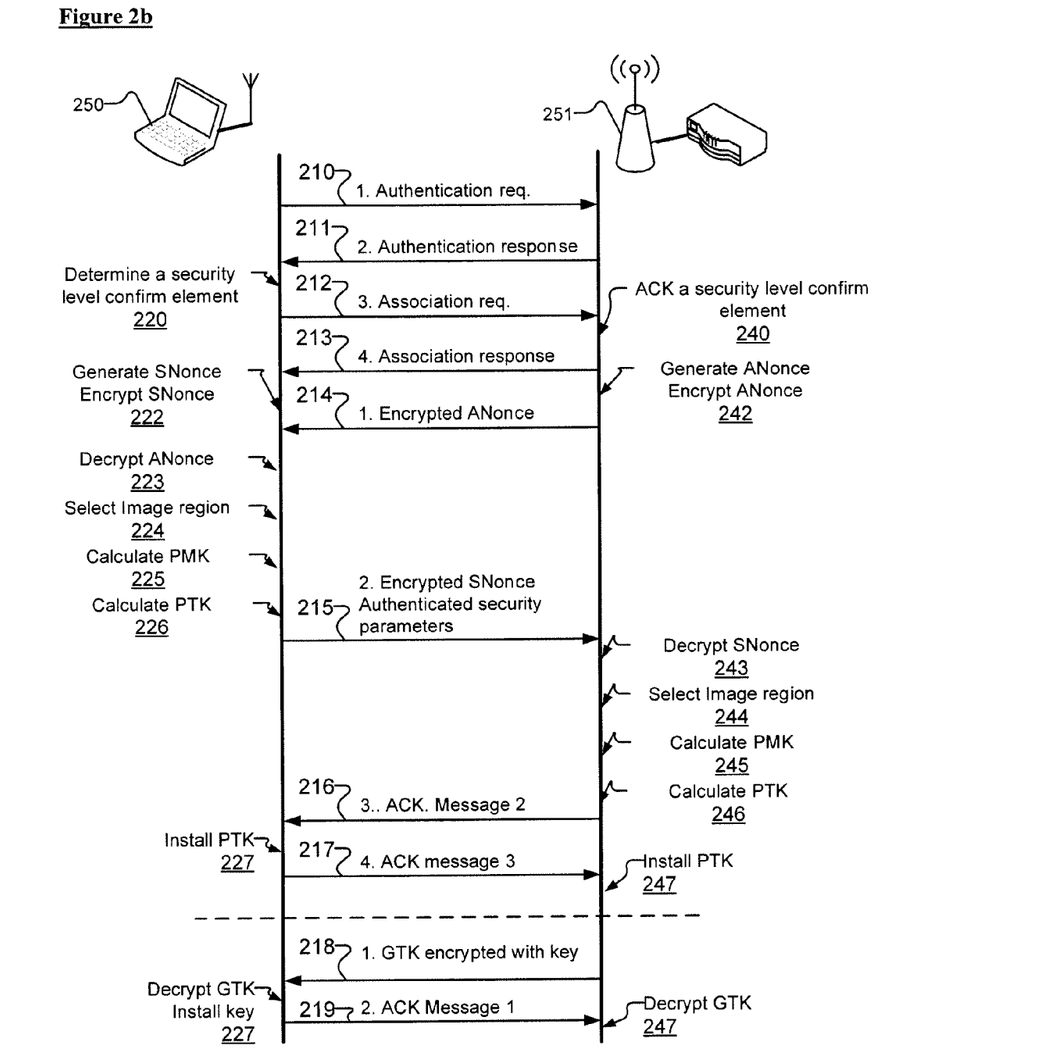
FIG. 2b shows a sequence of operations performed by a communication system in accordance with one embodiment of the invention.

FIG. 2b shows a sequence of operations performed by a communication system in accordance with one embodiment of the invention. Referring to FIG. 2b, in one embodiment, the communication system comprises client 250 (e.g., an electronic wireless device with respect to FIG. 1) and authenticator 251 (e.g., an access point with respect to FIG. 1). In one embodiment, client 250 comprises a network apparatus described with respect to FIG. 2. In one embodiment, authenticator 251 comprises a network apparatus described with respect to FIG. 2.

In one embodiment, a single wireless AP (e.g., authenticator 251) supporting one or multiple wireless clients (e.g., client 250) is known as a Basic Service Set (BSS). A set of two or more wireless APs connected to the same wired network is known as an Extended Service Set (ESS). An ESS is a single logical network segment (also known as a subnet), and is identified by a Service Set Identifier (SSID).

In one embodiment, client 250 sends a request for authentication (process 210). Authenticator 251 responses to the request (process 211). In one embodiment, client 250 determines a security level and generates a security level confirm element (process 220). In one embodiment, client 250 sends an association request to authenticator 251 (process 212). In one embodiment, authenticator 251 sends an association response to client 250 (process 213). The security level confirm element will be described in further detail below with additional reference to FIG. 5.

In one embodiment, client 250 also includes a number (or an identifier) in the association request to indicate an image to be used for a subsequent key generation process.

In one embodiment, authenticator 251 processes the request and the security level confirm element. Authenticator 251 sends a response to client 250 (process 212) to acknowledge the security level. In one embodiment, authenticator 251 also acknowledges the number (or an identifier) for selecting an image.

In one embodiment, after the authentication and association process, client 250 generates an SNonce (process 222). In one embodiment, authenticator 251 generates an ANonce and encrypts the ANonce (process 242). In one embodiment, authenticator 251 sends the encrypted version of the ANonce to client 250. In one embodiment, the ANonce is encrypted with a symmetric cryptography algorithm (e.g., AES).

In one embodiment, upon receiving the encrypted ANonce, client 250 decrypts the message to retrieve the ANonce. Client 250 selects an image region based on the ANonce and the SNonce by using a hash function (process 224). Client 250 also generates a PMK and a PTK (process 225 and 226). In one embodiment, client 250 selects an image region and generates the keys according to operations described with respect to FIG. 2a.

In one embodiment, client 250 sends an encrypted version of the SNonce and other authenticated security parameters (e.g., message integrity check (MIC)) to authenticator 251 (process 215). In one embodiment, the SNonce is encrypted with a symmetric cryptography algorithm (e.g., AES).

In one embodiment, authenticator 251 receives the encrypted SNonce. Authenticator 251 decrypts the message to retrieve the SNonce (process 243). Authenticator 251 selects an image region based on the ANonce, the SNonce by using a hash function (process 244). The region selected is the same image region as selected by client 250 because both client 250 and authenticator 251 have communicated the values of the ANonce and the SNonce.

In one embodiment, authenticator 251 generates the PMK and a PTK (process 245 and 246). In one embodiment, authenticator 251 selects an image region and generates the keys according to operations described with respect to FIG. 2a. In one embodiment, authenticator 251 also performs MIC checking to verify message integrity.

In one embodiment, client 250 and authenticator 251 continue to perform remaining operations in accordance with a 4-way handshake described in IEEE 802.11i standard. In one embodiment, client 250 installs the PTK (process 227) upon receiving "ACK message 2" from authenticator 251 (process 216). In one embodiment, authenticator 251 installs the PTK (process 247) upon receiving "ACK message 3" from client 250 (process 217). In one embodiment, client 250 and authenticator 251 also communicate and install a group temporal key (GTK) in accordance with IEEE 802.11i standard.

In one embodiment, authenticator 251 and client 250 communicates values of an ANonce and an SNonce by only sending the encrypted versions thereof. This improves the security of a wireless connection as compared to conventional systems which exchange an ANonce and an SNonce without any encryption protection.

In one embodiment, both client 250 and authenticator 251 store two or more images. Each image is identifiable with a number. In one embodiment, client 250 and authenticator 251 select an image to be used based on the ANonce and the SNonce. In one embodiment, a number indicating which image to use is determined based on a function defined as follows:

ImageNo=APHash(ANonce‖SNonce,sizeof (ANonce‖SNonce)),TotalSharedImages), where "TotalSharedImages" represents the total number of shared images In one embodiment, client 250 uses a different PMK in each association. Therefore, the system will not be compromised even if one of the PMK is cracked by a hacker. Additionally, if client 250 is compromised, other clients connecting to authenticators (e.g., authenticator 251) in a same ESS will not be affected because the other clients are not using a same PMK.

In one embodiment, the length of a bit string comprising an ANonce, an SNonce, and contents of a selected region from an image is at least 500 bytes. It is highly impossible to recover the image contents from a 32-byte PMK, even if a hacker is able to find out the current 32-bytes PMK.

In one embodiment, generating a PMK based on contents of an image region is used in conjunction with other protocols, such as, for example, IEEE 802.16 and IEEE 802.21. In one embodiment, a 160-bit PMK is used in accordance with the IEEE 802.16 standard. In one embodiment, a master session key (MSK) is generated using the process of generating a PMK.

Figure 3:
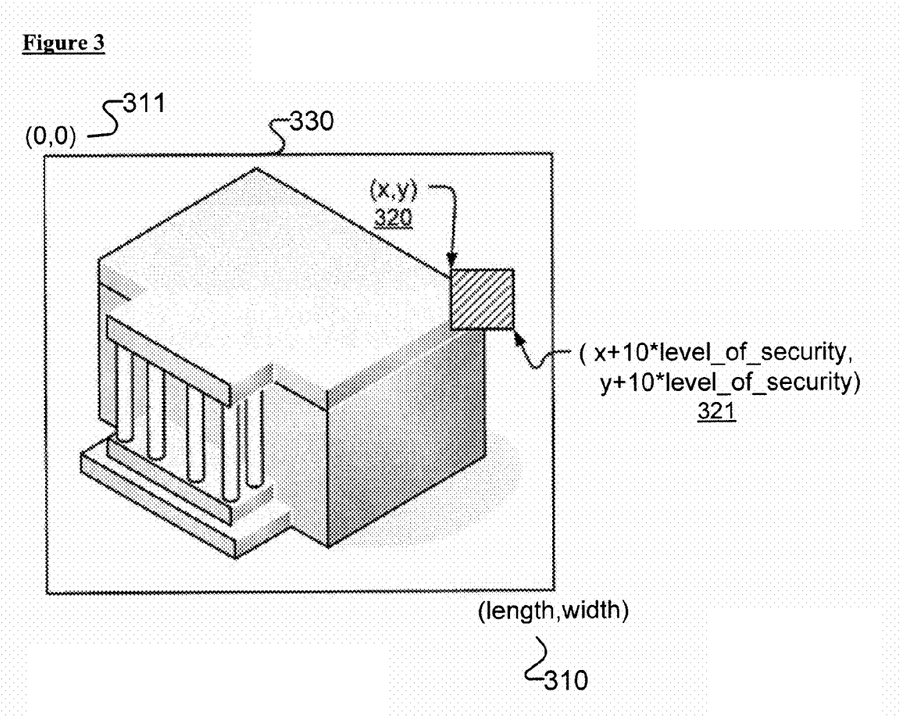
FIG. 3 shows an example of an image for use in one embodiment of a process to generate a pairwise master key.

FIG. 3 shows an example of an image for use in one embodiment of a process to generate a pairwise master key. Referring to FIG. 3, in one embodiment, the dimension of image 330 is defined by the length and the width (i.e., 310). In one embodiment, the upper left corner of image 330 is defined as the origin (0, 0) (i.e., 311).

In one embodiment, the length of image 330 is larger or equal to 10* a number indicating the highest security level (e.g., 5). In one embodiment, the width of image 330 is larger than or equal to 10* the number indicating the highest security level.

In one embodiment, a level of security is associated with an integer (e.g., 1-5). In one embodiment, a level 1 indicates that the size of an image region is 10 pixels by 10 pixels. A level 2 indicates that the size of an image region is 20 pixels by 20 pixels. The other levels of security indicate different sizes of image regions correspondingly.

In one embodiment, a rectangular region from image 330 is selected based on an ANonce and an SNonce. In one embodiment, a pair of coordinates (x, y) (e.g., 320) is calculated using the functions defined as follows:

$x$=APHash(ANonce,sizeof(ANonce),length−10*level_of_security)

$y$=APHash(SNonce,sizeof(SNonce),width−10*level_of_security)

Note: length and width indicate the dimension of an image; level_of_security is an integer ranging from 1 to 5.

In one embodiment, a rectangular region in an image is selected for use in a key generation process. The upper left corner of the region is indicated by coordinates (x, y) (e.g., 320), whereas, the lower right corner of the region is indicated by coordinates (x+10*level_of_security, y+10*level_of_security) (e.g., 321). In one embodiment, values of length and width of the image are larger than the value of 10* level_of_security (e.g., 20-1000 times larger).

In one embodiment, image 330 is stored in a 24 Bit Bitmap format. In one embodiment, contents of an image region are data representing each pixel of in the region. In one embodiment, the number of bytes (representing the image region) based on each security level is listed as follows (approximately): 450 bytes for level 1, 1398 bytes for level 2, 3030 bytes for level 3, 5138 bytes for level 4, and 8010 bytes for level 5.

In one embodiment, other image formats, such as, for example, monochrome, 256 Color Bitmap, 24-bit Bitmap, JPEG, GIF, TIFF, PNG, or a combination thereof is used. In one embodiment, an image with high color variability is used so that data representing different regions of the image are of low correlation.

Figure 4:
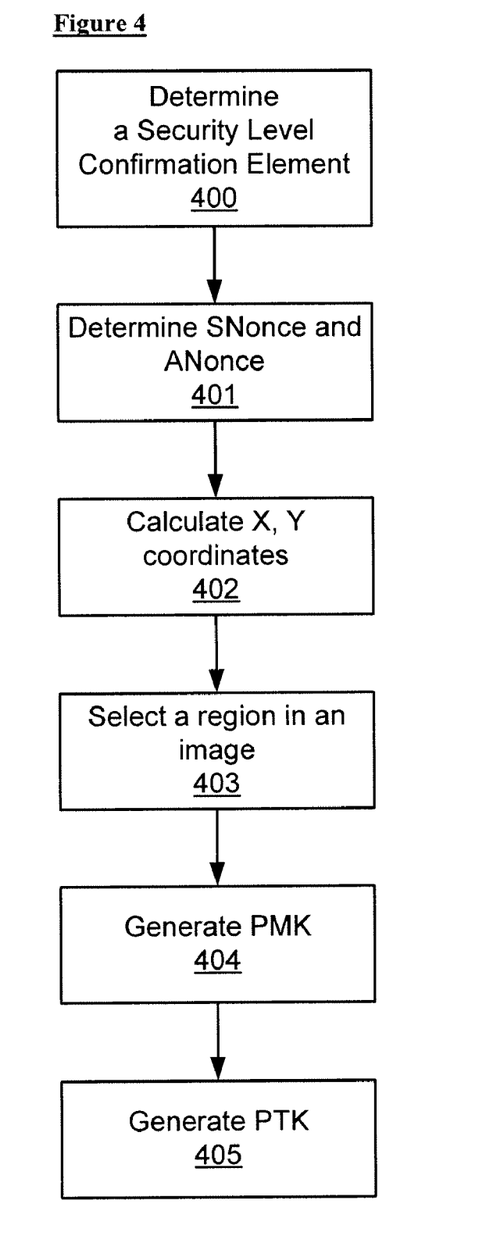
FIG. 4 is a flow diagram of one embodiment of a process to generate encryption keys for use in establishing wireless connection.

FIG. 4 is a flow diagram of one embodiment of a process to generate encryption keys for use in establishing wireless connection. The process is performed by processing logic that may comprise hardware (circuitry, dedicated logic, etc.), software (such as one that is run on a general purpose computer system or a dedicated machine), or a combination of both. In one embodiment, the process is performed in conjunction with a network apparatus (e.g., network apparatus 260 with respect to FIG. 2a). In one embodiment, the process is performed by a computer system with respect to FIG. 6.

Referring to FIG. 4, in one embodiment, processing logic begins by determining a security level confirmation element (process block 400). In one embodiment, processing logic determines a security level (e.g., 1-5) and sends a security level confirmation element to an authenticator. In other embodiment, processing logic receives a security level confirmation element from a client (if processing logic is an authenticator).

In one embodiment, processing logic determines an SNonce and an ANonce (process block 401). In one embodiment, processing logic generates an SNonce and receives an encrypted version of an ANonce. Processing logic decrypts the encrypted ANonce. In other embodiment, processing logic generates an ANonce and receives an encrypted version of SNonce. Processing logic decrypts the encrypted SNonce.

In one embodiment, processing logic calculates an x-coordinate based on the ANonce and the level of security by using a hash function (e.g., APhash function). In one embodiment, processing logic calculates a y-coordinate based on an SNonce and the level of security (process block 402). In one embodiment, processing logic calculates (x, y) coordinates in accordance with operations described above with respect to signature generator 269.

In one embodiment, processing logic selects a rectangular region in an image (process block 403). In one embodiment, coordinates of the top left corner of the region is (x, y), whereas, coordinates of the bottom right corner of the region is (x+10*level_of_security, y+10*level_of_security). In one embodiment, processing logic retrieves a bit string representing contents of the selected region.

In one embodiment, processing logic generates a PMK based on the ANonce, the SNonce, and the bit string by using a hash function (e.g., SHA-256) (process block 404). In one embodiment, the PMK is a 256-bit string. In one embodiment, processing logic generates a PMK in accordance with operations described above with respect to PMK generator 262.

In one embodiment, processing logic generates a PTK based on the PMK (process block 405). In one embodiment, processing logic generates the PTK in accordance with operations described above in reference to PTK generator 263.

Figure 5:
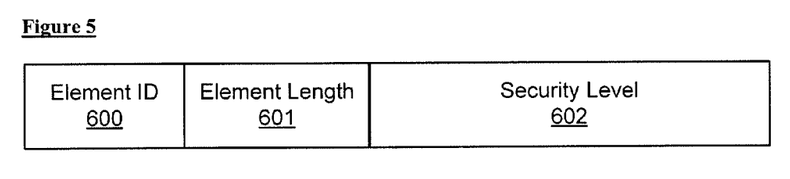
FIG. 5 shows an embodiment of a security level confirm element.

FIG. 5 shows an embodiment of a security level confirm element. In one embodiment, a security level confirm element is a message sent by a client to an authenticator to negotiate a security level. In one embodiment, an authenticator accepts the security level and acknowledges the security level. In other embodiment, the security level confirm element is attached into packets in an association request and an association response.

In one embodiment, the message comprises element ID 600, element length 601, and security level 602. In one embodiment, element ID 600 stores information indicating a type of the message. In one embodiment, element length 601 stores a value indicating a length of the message. In one embodiment, security level 602 is a two-byte data.

In one embodiment, a security level is associated with an integer (e.g., ranging from 1 to 5). In one embodiment, a higher value indicates that a higher security level. In one embodiment, a default security level is 3. In one embodiment, a higher security level causes a longer transition time when a client roams to another authenticator. In one embodiment, a roaming transition time is approximately 1.0 second for the security level 3.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 6:
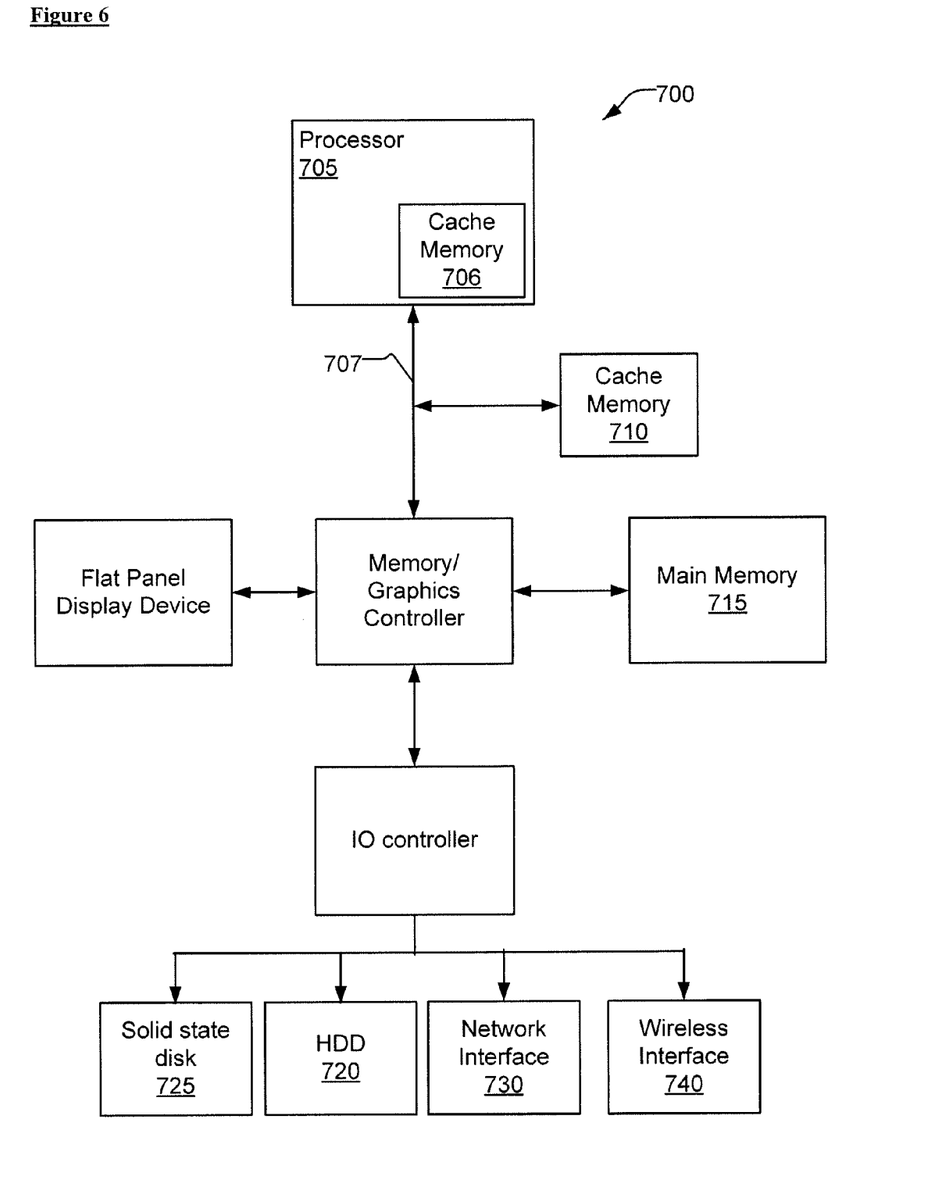
FIG. 6 illustrates a computer system for use with one embodiment of the present invention.

FIG. 6 illustrates an example of computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Figure 7:
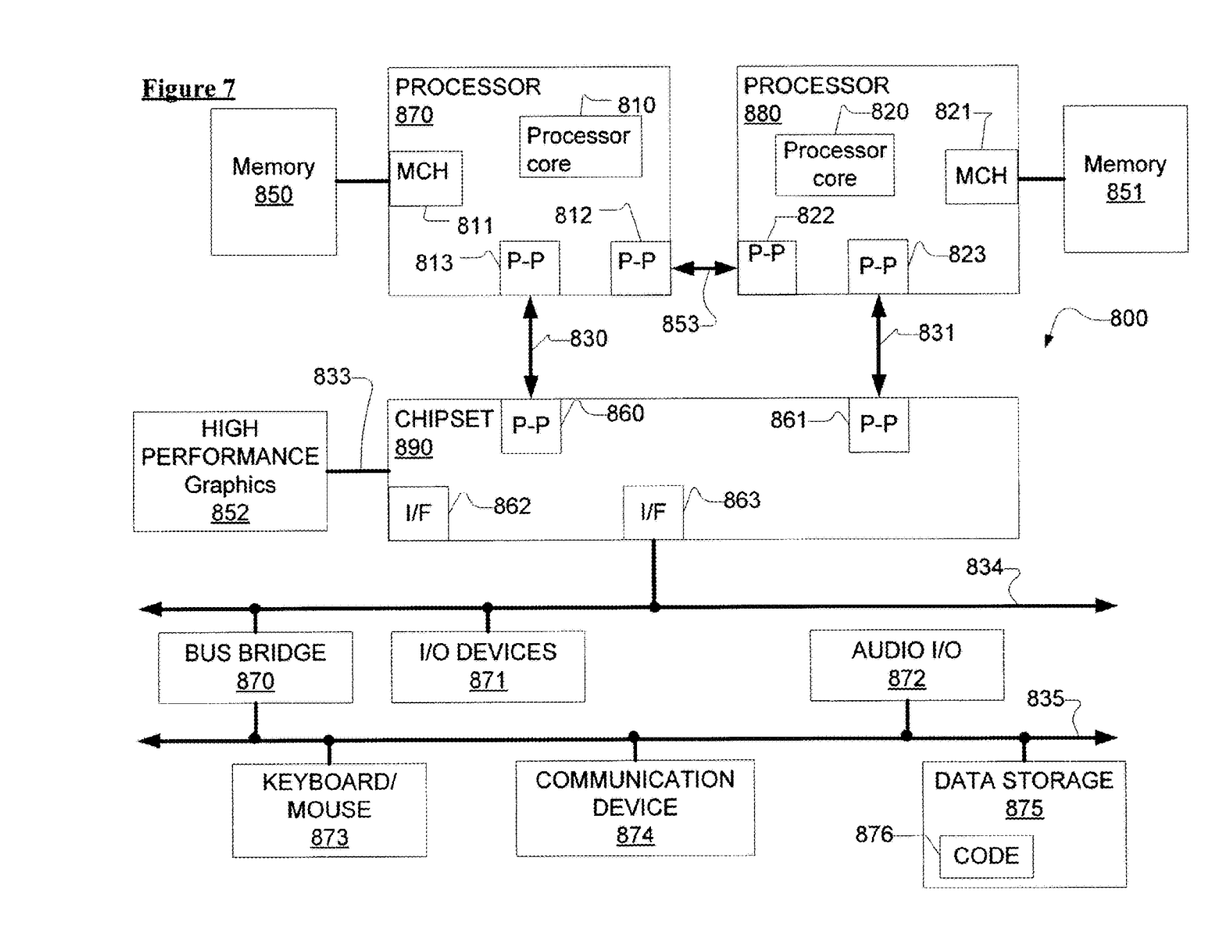
FIG. 7 illustrates a point-to-point computer system for use with one embodiment of the invention.

Similarly, at least one embodiment may be implemented within a point-to-point computer system. FIG. 7 illustrates an example of a computer system that is arranged in a point-to-point (PtP) configuration. In particular, FIG. 7 shows a system where processors, memory, and input/output devices are interconnected by a number of point-to-point interfaces.

The system of FIG. 7 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 7.

Other embodiments of the invention, however, may exist in other circuits, logic units, or devices within the system of FIG. 7. Furthermore, in other embodiments of the invention may be distributed throughout several circuits, logic units, or devices illustrated in FIG. 7.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
    selecting, by at least one processor, a first image from a plurality of pre-shared images;
    determining, by the at least one processor, a first region within the first image based at least in part on a first value indicating a security level, wherein a size of the first region increases based at least in part on an increase in the first value;
    generating, by the at least one processor, a first key, based at least in part on contents of the first region; and
    transmitting, by the at least one processor, the first key to an access point to secure a wireless connection.

2. The method of claim 1, wherein the first key is a shared secret key generated by using a cryptographic hash function.

3. The method of claim 1, further comprising:
    receiving, from the access point, a first random number, wherein the first random number is used in part to generate the first region;
    generating, by the at least one processor, a second random number; and
    determining, by the at least one processor, a random point within the first region based at least in part on the first random number and the second random number.

4. The method of claim 1, further comprising generating a second key based at least on contents of a second region in the first image.

5. The method of claim 1, wherein the contents of the first region comprise at least 500 bytes of data.

6. The method of claim 1 wherein determining the first region further comprises:
    generating, by the at least one processor, first random data;
    receiving, by the at least one processor, an encrypted version of second random data;
    determining, by the at least one processor, a random point within the first region based on the encrypted version of the second random data and the first value indicating a security level; and
    identifying, by the at least one processor, the first region based at least in part on the size and the random point.

7. The method of claim 1, further comprising:
    generating, by the at least one processor, first random data;
    receiving, by the at least one processor, an encrypted version of second random data from a remote system,
    determining, by the at least one processor, the first region defined by a random point and the size, the random point is identified at least in part on the first value and a second value, wherein the first value is generated by applying a first hash function to a first random data and the second value is generated by
    applying a second hash function to the encrypted version of the second random.

8. The method of claim 1, further comprising:
    generating first random data;
    receiving an encrypted version of second random data from a remote system; and
    selecting a second image of the plurality of pre-shared images including based on a result from a first hash function based at least on the first random data and the encrypted version of the second random data.

9. The method of claim 1 further including transmitting an association request, by a processor, to associate wirelessly with an access point.

10. A wireless apparatus comprising:
    memory to store a first image; and
    a controller operable to:
        select the first image from a plurality of pre-shared images;
        determine a first region within the first image based at least in part on a first value indicating a security level, wherein a size of the first region increases based at least in part on an increase in the first value;
        generate a first key, based at least in part on contents of the first region, for use in establishing a wireless connection.

11. The wireless apparatus of claim 10, further comprising key generation logic to generate the first key which is a shared secret key.

12. The wireless apparatus of claim 10, wherein the controller is further operable to:
    generate first random data; and
    receive an encrypted version of second random data from a remote system, wherein generating the first key is further based on the first random data and the encrypted version of the second random data.

13. The wireless apparatus of claim 10, wherein the controller is operable to generate a second key based at least on contents of a second region in the first image.

14. The wireless apparatus of claim 10, wherein the controller is further operable to:
    generate first random data;
    receive an encrypted version of second random data;
    determine a random point within the first region based on the encrypted version of the second random data and the first value indicating the security level; and identify the first region based at least in part on the size and the random point.

15. The wireless apparatus of claim 10, wherein the controller is operable to
generate first random data;
receive an encrypted version of second random data from a remote system; and
select one of a plurality of pre-shared images based on a result from the first hash function based at least on the first random data and the second random data.

16. A system comprising
a controller operable to:
determine a first value indicating a security level, wherein a size of a first region increases based at least in part on an increase in the first value;
determine the first region within the first image by identifying a random point associated with the first region based on received data and the first value;
identify the first region based at least in part on the size and the random point;
generate a first key, based at least in part on one or more characteristics associated with the first region;
secure a wireless connection based at least in part on the first key; and
a processor coupled to use the wireless connection.

17. The system of claim 16, wherein the first key is a shared secret key.

18. The system claim 16, wherein the controller is further operable to:
generate first random data;
receive an encrypted version of second random data from a remote system; and
select one of a plurality of pre-shared images based on a result from a first hash function based at least on the first random data and the second random data.

19. An article of manufacture comprising a non-transitory computer readable storage medium including data storing instructions thereon that, when accessed by a machine, cause the machine to perform a method comprising:
determining, by at least one processor a first region within the first image by determining a first value indicating a security level, wherein a size of the first region increases based at least in part on an increase in the first value;
generating, by the at least one processor, a first key, based at least in part on contents of the first region; and
transmitting, by the at least one processor, the first key to an access point to secure a wireless connection.

20. The article of manufacture of claim 19, wherein the first key is a shared secret key generated using a cryptographic hash function.

21. The article of manufacture of claim 19, wherein the method further comprises:
generating, by the at least one processor, first random data; and
receiving an encrypted version of second random data, by the at least one processor, from a remote system, wherein generating the first key is further based on the first random data and the second random data.

22. The article of manufacture of claim 19, wherein the method further comprises:
generating, by the at least one processor, first random data;
receiving, by the at least one processor, an encrypted version of second random data from a remote system;
determining, by the at least one processor, a random point within the first region based on the encrypted version of the second random data and the first value indicating the security level; and
identifying, by the at least one processor, the first region based at least in part on the size and the random point.

23. The article of manufacture of claim 19, wherein determining the further region further comprises:
generating first random data;
receiving an encrypted version of second random data from a remote system; and
selecting a second image of a plurality of pre-shared images based on result from a first hash function based at least on the first random data and the second random data.

* * * * *